Figure 1:
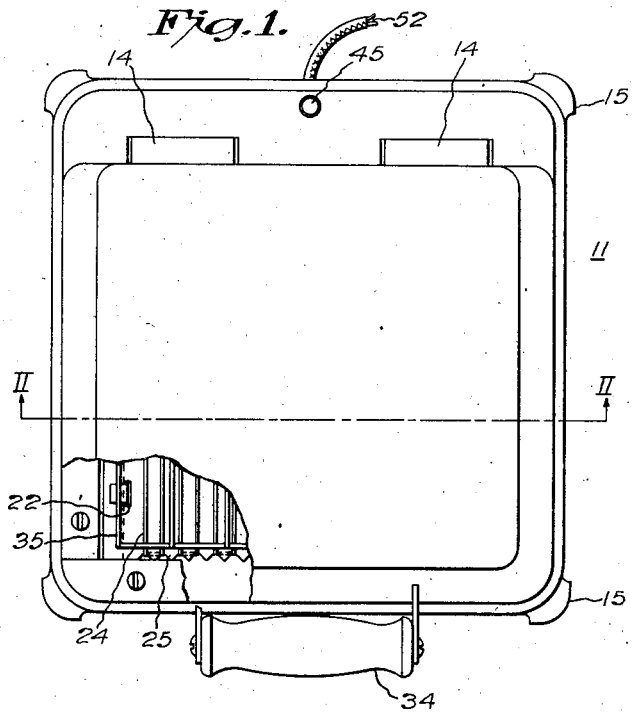

April 12, 1927.

E. E. SUTHERLAND

ELECTRIC TOASTER AND GRILL

Filed June 7, 1926

1,624,445

2 Sheets-Sheet 1

WITNESSES:
G. S. Neilson
N. M. Biebel

INVENTOR
Ernest E. Sutherland
BY
Wesley G. Carr
ATTORNEY

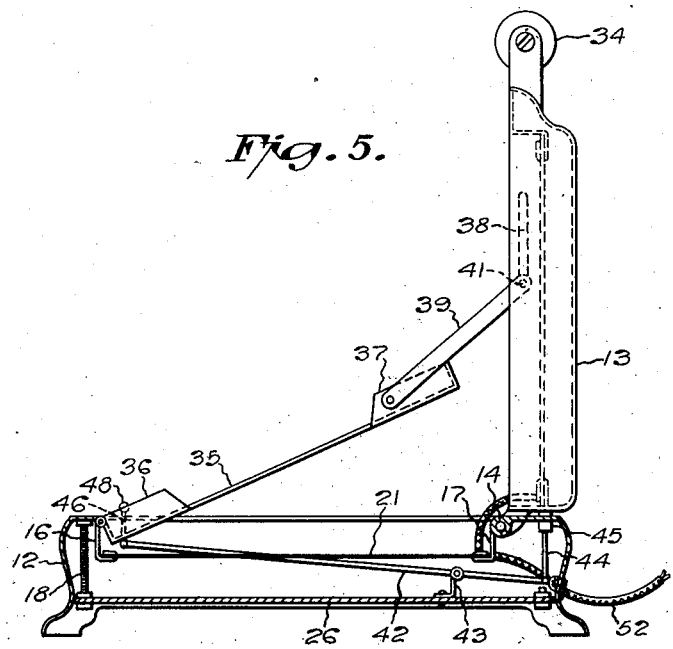
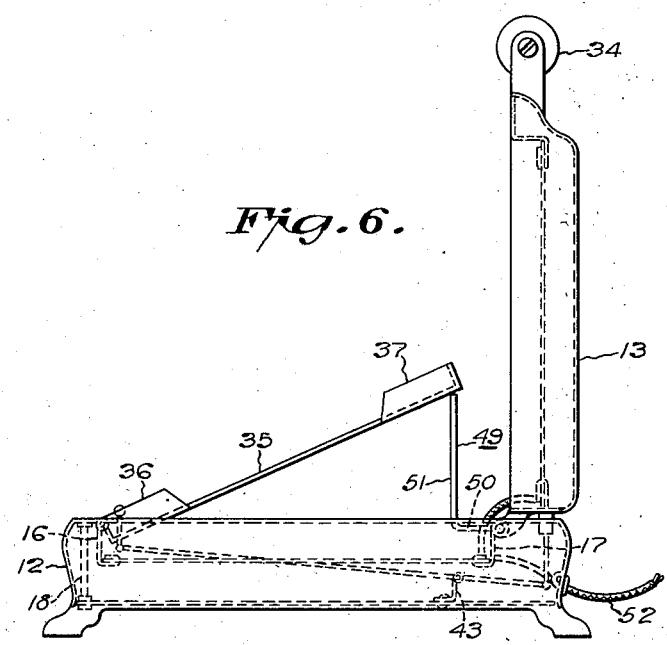

Patented Apr. 12, 1927.

1,624,445

UNITED STATES PATENT OFFICE.

ERNEST E. SUTHERLAND, OF MANSFIELD, OHIO, ASSIGNOR TO WESTINGHOUSE ELECTRIC & MANUFACTURING COMPANY, A CORPORATION OF PENNSYLVANIA.

ELECTRIC TOASTER AND GRILL.

Application filed June 7, 1926. Serial No. 114,108.

My invention relates to electrically-heated devices and particularly to electric toasters.

One object of my invention is to provide a relatively simple, inexpensive and compact electrically-heated toaster.

Another object of my invention is to provide an encased toaster of relatively simple and pleasing design that shall require a minimum amount of electrical energy in its operation.

Another object of my invention is to provide an encased electric toaster having means for effecting a tilting movement of a material-supporting means and embodying automatic means for causing removal of a toasted slice of bread from the toaster.

In practicing my invention, I provide a lower casing having supporting means associated therewith, and an upper casing pivotally mounted on the lower casing, together with extended electric heating units in each of said casings. A material-supporting means is provided, one end of which is raised by an angular movement of the upper casing with respect to the lower casing, and automatic means is provided, actuated by the upper casing, for raising the front edge of the toasted slice of bread to effect its quick removal from the toaster.

Figure 2:
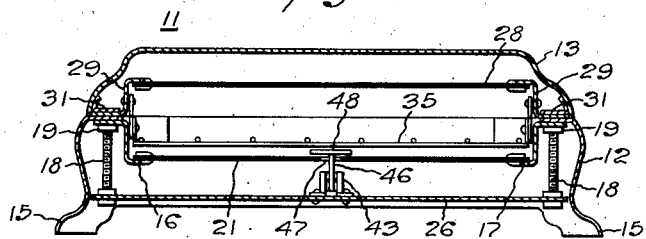
Figure 3:
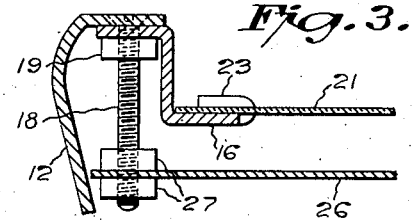
Figure 4:
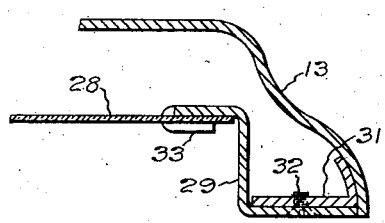

In the drawings,

Figure 1 is a top plan view of a device embodying my invention, certain portions being cut away, Fig. 2 is a view, in section, taken on the line II—II of Fig. 1, Fig. 3 is a fragmentary sectional view on an enlarged scale, Fig. 4 is an enlarged sectional view of a portion of the device embodying my invention, Fig. 5 is a view, partially in side elevaton and partially in section, of a device embodying my invention and shown in its open position, and Fig. 6 is a view, in side elevation, of a modified form of device embodying my invention.

A horizontal toaster 11 comprises a lower casing 12 and an upper casing 13 having a pivotal connection therebetween, indicated by the numeral 14, in Figs. 1 and 5 of the drawings. The lower casing 12 is provided with a plurality of legs 15. As the ordinary slice of bread is substantially square or, at least, rectangular, I prefer to make both casings of substantially square shape in outline, although my invention is not limited to a particular shape or dimensions.

The lower casing 12 is open at its top and bottom and is provided, at the front and at the rear edges thereof, with depending sheet-metal members 16 and 17, each of substantially Z-shape in lateral section, as shown more particularly in Figs. 2 and 3 of the drawings. The members 16 and 17 are secured to inwardly-extending flange portions of the casing 12, by means of relatively long flat-head machine screws 18 and cooperating nuts 19, as is more particularly shown in Fig. 3 of the drawings.

A heating unit, located within the lower casing 12, comprises a sheet 21, of relatively thin electric-insulating material, such as mica, the opposed edge portions of which are provided with openings 22, as shown more particularly in Fig. 1 of the drawing, through which extend integral and return-bent portions 23 of the members 16 and 17. This supports the sheet of electric insulating material 21 in substantially the position illustrated in Fig. 2 of the drawing within the casing 12.

A strip 24 of resistor material, such as nichrome, is wound back and forth over the upper surface of the member 21, opposed edges of which are serrated, as indicated at 25 in Fig. 1 of the drawing. While I have illustrated a specific embodiment of a heating unit, I do not desire to be limited thereto as any heating unit, which is extended uniformly over substantially the entire surface of the casing 12, may be employed.

A heat-insulating barrier 26, in the form of a metal sheet, is located below the heating unit embodying the support 21 and the resistor 24 and is preferably supported by the bolts or screws 18, co-operating units 27 being provided on the lower end of the member 18 to hold the sheet 26.

The upper casing 13 is of substantially the same construction, as noted hereinbefore with regard to the casing 12, except that it is closed at its upper end, as shown more particularly in Figs. 2 and 4 of the drawing. The general form and outline of the upper and the lower casings is such that they will present a pleasing and complementary appearance.

A heating unit comprising a thin sheet 28, of electric-insulating material, and a resistor member wound thereon and substantially the same as hereinbefore described for the lower casing, is supported within the upper casing 13 by a plurality of members 29, each of substantially Z-shape in lateral section. In order to support the members 29 and the heating unit supported thereby from the upper casing, I provide a formed or shaped strip 31, of substantially L-shape in lateral section, which may be brazed or welded to the lower rim of two opposed edge portions of the cover 13, substantially as illustrated in Figs. 2 and 4 of the drawings.

The members 29 may be secured to the members 31 by short machine screws 32. The sheet 28 is held by return-bent portions 33 integral with the members 29, in substantially the same manner as was hereinbefore described in connection with the heating unit associated with, and located in, the lower casing 12.

A handle member 34 is provided on the upper casing 13, to which it may be secured in any suitable or desired manner to permit of turning the upper casing upwardly and backwardly to substantially the position shown in Figs. 5 and 6 of the drawings.

Referring more particularly to Fig. 5 of the drawings, I have illustrated therein a means for effecting a forward tilting movement of a material-supporting means 35 which may be of any suitable or described construction and is shown as a foraminous tray having side portions 36 and 37 of sheet metal. The tray 35 is pivotally mounted on the upper flange portion of the front edge of the lower casing 12 in any desired manner. The side portions of the upper casing 13 may be provided with an elongated slot 38, or any additional strip may be provided within the casing 13 at the sides thereof, within which the elongated slot 38 may be provided at each side of the upper casing 13. Link members 39 have ends pivotally connected to the respective members 37 and other ends pivotally connected, by means of pins 41 to the upper casing, the pins being located in the slots 38. When the upper casing 13 is located against, and is resting on, the lower casing 12, the tray 35 will rest just above the lower heating unit 21, suitable supporting means (not shown) being provided for the rear edge thereof, and the link member 39 will extend forwardly from the pivotal connection therewith to the members 37. When the upper casing is moved upwardly into substantially the position shown in Fig. 5 of the drawings, the rear end or portion of the material-supporting means 35 is raised upwardly to substantially the position shown in Fig. 5 of the drawing.

This position of the tray removes it and a slice of bread located therein, from close operative relation to both the lower and the upper heating units, so that any toasting action thereof will be stopped and also the tray and the slice of bread thereon will be in position to permit of removing the toasted slice of bread from the tray and of placing a fresh slice of bread thereon.

Means for effecting an upward movement of the front end of a toasted slice of bread, comprises a lever 42 which is pivotally mounted, intermediate its ends, on members 43 which may be secured to the heat shield 26, as is shown more particularly in Fig. 5 of the drawings. The rear end of the lever 42 is pivotally connected to an upwardly extending link 44, the upper end of which terminates in, or fits into, a member 45, which is relatively larger in lateral section than the link 44 and projects through a suitable opening in the rear inwardly extending flange portion of the casing 12. The forward end of the lever 42 is pivotally connected to an upwardly extending line 46 which extends through a suitable elongated opening 47 in the sheet 21 and has a short cross arm 48 mounted at the upper end thereof.

I have illustrated, in Fig. 6 of the drawings, another means for causing an upward movement of the rear portion of the tray 35. This means comprises one or more levers 49 which are rigidly secured to the upper casing 13 to turn therewith. Each of the levers 49 has a relatively short arm 50 and a relatively long arm 51, the portion 51 extending in a substantially horizontal direction below the tray 35 when the casing 13 is in its closed position, as shown more particularly in Fig. 2 of the drawings.

If it be assumed that a slice of bread (not shown) has been placed in the tray 35 and toasted, the upper casing having been located on the lower casing, and it is desired to remove the slice of bread, the upper casing is given an upward and backward turning movement to substantially the position illustrated in Fig. 5 of the drawings, whereby the pin 41 is caused to travel from the forward portion of the slot 38 to the rear portion or the bottom portion, which causes a tilting movement of the rear portion of the tray 35. As the casing 13 is turned through the last portion of its angular movement into substantially the position shown in Fig. 5, it will engage the knob 45 and cause the knob to move downwardly, so that the cross arm 48 is moved upwardly into substantially the position shown in Fig. 5, whereby the front end of the toasted slice of bread is caused to move quickly out of the tray and, if the inclination of the tray is sufficient, will slide over the front edge of the casing 12 and may be grasped by an operator without the necessity of touching the slice of bread while in the tray.

The device illustrated in Fig. 6, causes an upward tilting movement of the rear portions of the tray, by having the outer ends of the legs 51 which is normally out of engagement with the tray, engaging therewith upon turning movement of the casing 13 and raising the rear portion thereof, as shown in Fig. 6, in accordance with the turning movement of the casing 13.

Any desired means for connecting the heating units in the top and bottom casing may be employed, and I have illustrated these schematically only as embodying a suitable twin conductor 52, other connections being made in a manner well known in the art.

The device embodying my invention thus provides a relative simple, small and inexpensive encased toaster having a tray-raising means embodied therein operatively connected with the upper casing to be actuated thereby when the upper casing is given an angular turning movement relative to the lower casing. Means, automatically actuated by the upper casing in the last part of its turning movement, effects a movement of the toasted slice of bread out of the tray, the slice of bread being permitted to move forwardly by the inclination of the tray which has been effected by a turning movement of the upper casing.

Various modifications may be made in the device embodying my invention without departing from the spirit and scope thereof, and I desire, therefore, that only such limitations shall be imposed thereon as are imposed by the prior art and set forth in the appended claims.

I claim as my invention:

1. In a toaster, the combination with an upper and a lower casing pivotally connected, and heating means in each of said casings, of a material-supporting means associated with said casings, and means actuated by the other of said casings for effecting a tilting movement of said material-supporting means.

2. In a toaster, the combination with an upper and a lower casing pivotally connected, and heating means in each of said casings, of a material-supporting means associated with said casings, and means for varying the position of said material-supporting means in accordance with a turning movement of the other of said casings.

3. In a toaster, the combination with a lower casing, an upper casing pivotally connected to the lower casing and movable relatively thereto, and electric heating means in each of said casings, of a tray associated with said casings, and means for causing a tilting movement of said tray in accordance with an opening movement of the upper casing.

4. In a toaster, the combination with a lower casing, an upper casing pivotally connected to the lower casing and movable relatively thereto, and electric heating means in each of said casings, of a tray associated with said casings and having a pivotal connection therewith, and means actuated in accordance with a turning movement of the upper casing for causing a turning movement of said tray.

5. In a toaster, the combination with a lower casing, an upper casing having a turning movement relatively to the lower casing, and heating means in each of said casings, of a tray normally in the lower casing and having a pivotal connection therewith, means actuated by the upper casing, for effecting a tilting movement of the tray, and means actuated by the upper casing for raising material in the tray.

6. In a toaster, the combination with a lower casing, an upper casing having a turning movement relatively to the lower casing, and a heating means in each of said casings, of a tray in one of said casings, and means actuated by the upper casing for raising material located in the tray.

7. In a toaster, the combination with a lower casing, an upper casing having a turning movement relatively to the lower casing, and heating means in each of said casings, of a tray associated with the casings, and means actuated by the upper casing in its turning movement for effecting a tilting movement of said tray and for raising material located therein.

8. In a toaster, the combination with a lower casing, an upper casing having a turning movement relatively to the lower casing, and heating means in each of said casings, of a tray associated with the casing, means actuated by the upper casing in the initial portion of its turning movement for causing a tilting movement of the tray, and means actuated by the upper casing at the end of its turning movement for raising material in the tray.

9. In a toaster, the combination with a lower casing, an upper casing having a turning movement relatively to the lower casing, and electric heating means in each of said casings, of a tray associated with the casings and pivotally connected to the lower casing, and means pivotally connected to the tray and the upper casing for causing a tilting movement of the tray in accordance with the turning movement of the upper casing.

In testimony whereof, I have hereunto subscribed my name this 27th day of May, 1926.

ERNEST E. SUTHERLAND.